United States Patent [19]

Gallien

[11] Patent Number: 5,480,515

[45] Date of Patent: Jan. 2, 1996

[54] ELECTROLYSIS CELL AND METHOD FOR GAS-DEVELOPING OR GAS-CONSUMING ELECTROLYTIC PROCESSES

[76] Inventor: Arnold Gallien, Gothaer Strasse 10 a, 96450 Coburg, Germany

[21] Appl. No.: 196,240

[22] PCT Filed: Jun. 12, 1992

[86] PCT No.: PCT/DE92/00499

§ 371 Date: Feb. 18, 1994

§ 102(e) Date: Feb. 18, 1994

[87] PCT Pub. No.: WO92/22681

PCT Pub. Date: Dec. 23, 1992

[30] Foreign Application Priority Data

Jun. 12, 1991 [DE] Germany .......................... 41 19 836.0

[51] Int. Cl.[6] .............................. B01D 59/40; C25B 1/00; C25B 3/00
[52] U.S. Cl. .......................... 204/1.11; 204/270; 204/284; 204/290 R; 204/293
[58] Field of Search ..................................... 204/256, 258, 204/265, 266, 270, 277, 278, 1.11, 284, 290 R, 293

[56] References Cited

U.S. PATENT DOCUMENTS

| | | | |
|---|---|---|---|
| 4,013,525 | 3/1977 | Emsley | 204/98 |
| 4,086,155 | 4/1978 | Jonville | 204/266 |
| 4,097,346 | 6/1978 | Robertson | 204/80 |
| 4,341,606 | 7/1982 | McIntyre et al. | 204/98 |
| 4,457,816 | 7/1984 | Galluzzo et al. | 204/270 X |
| 4,861,451 | 8/1989 | David | 204/278 X |
| 5,087,344 | 2/1992 | Wenske et al. | 204/270 X |

FOREIGN PATENT DOCUMENTS

| | | |
|---|---|---|
| 0159138 | 10/1985 | European Pat. Off. . |
| 128436 | 6/1919 | United Kingdom . |
| WO9100379 | 1/1991 | WIPO . |

*Primary Examiner*—Donald R. Valentine
*Attorney, Agent, or Firm*—Christie, Parker & Hale

[57] ABSTRACT

An electrolysis cell for gas-emitting or gas dissipating electrolytic processes using at least one electrode having a capillary structure in its edge region (51, 52) on the reaction side such that the gas (6) and electrolyte (L) are substantially conveyed there transversely to the electrode and in which there is a capillary slit adjoining this edge region which offers substantially less resistance to the conveyance of the gas and electrolyte along the vertical electrode plane than the edge region. The preferred embodiment are a plurality of foil-like (44), mutually supported, shaped electrode components. The process of the invention for running the electrolysis cell makes full use of its ejector effect, i.e. it supplies itself with electrolyte when the level of electrolyte in the cell is greatly reduced.

16 Claims, 3 Drawing Sheets

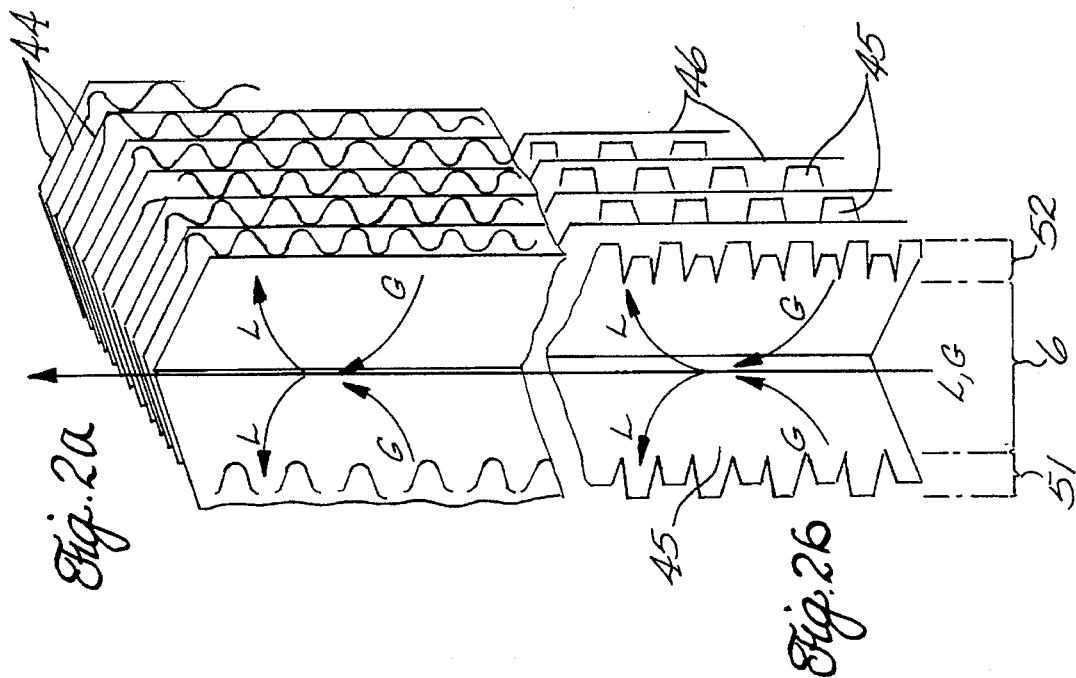
Fig. 2a
Fig. 2b
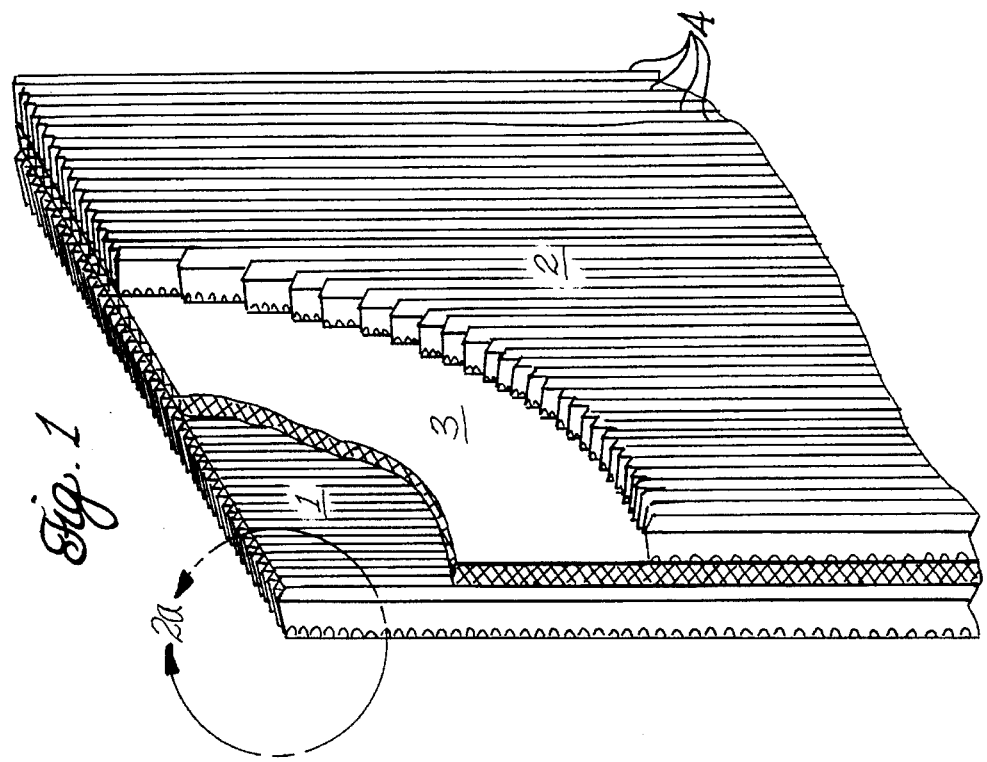
Fig. 1

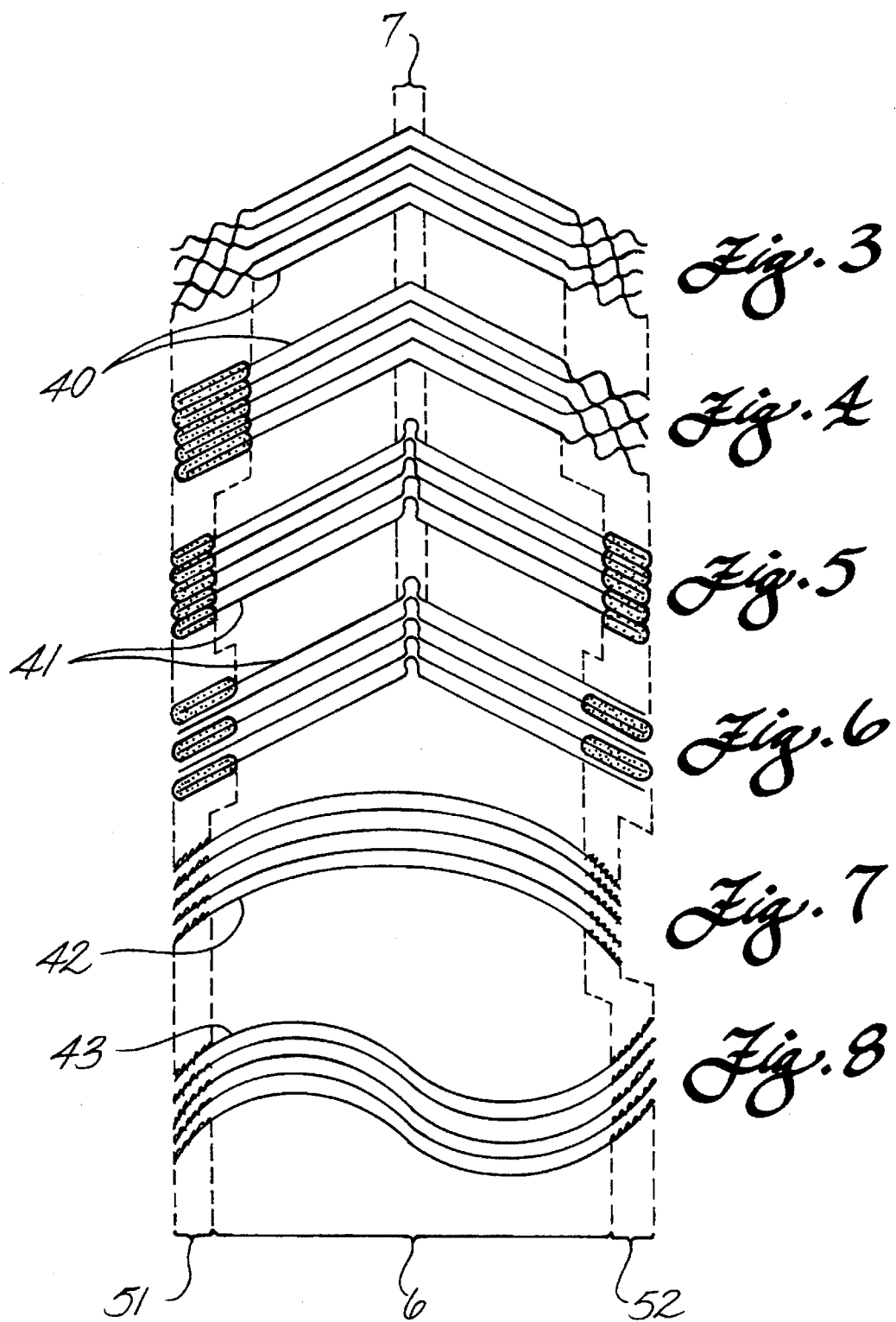

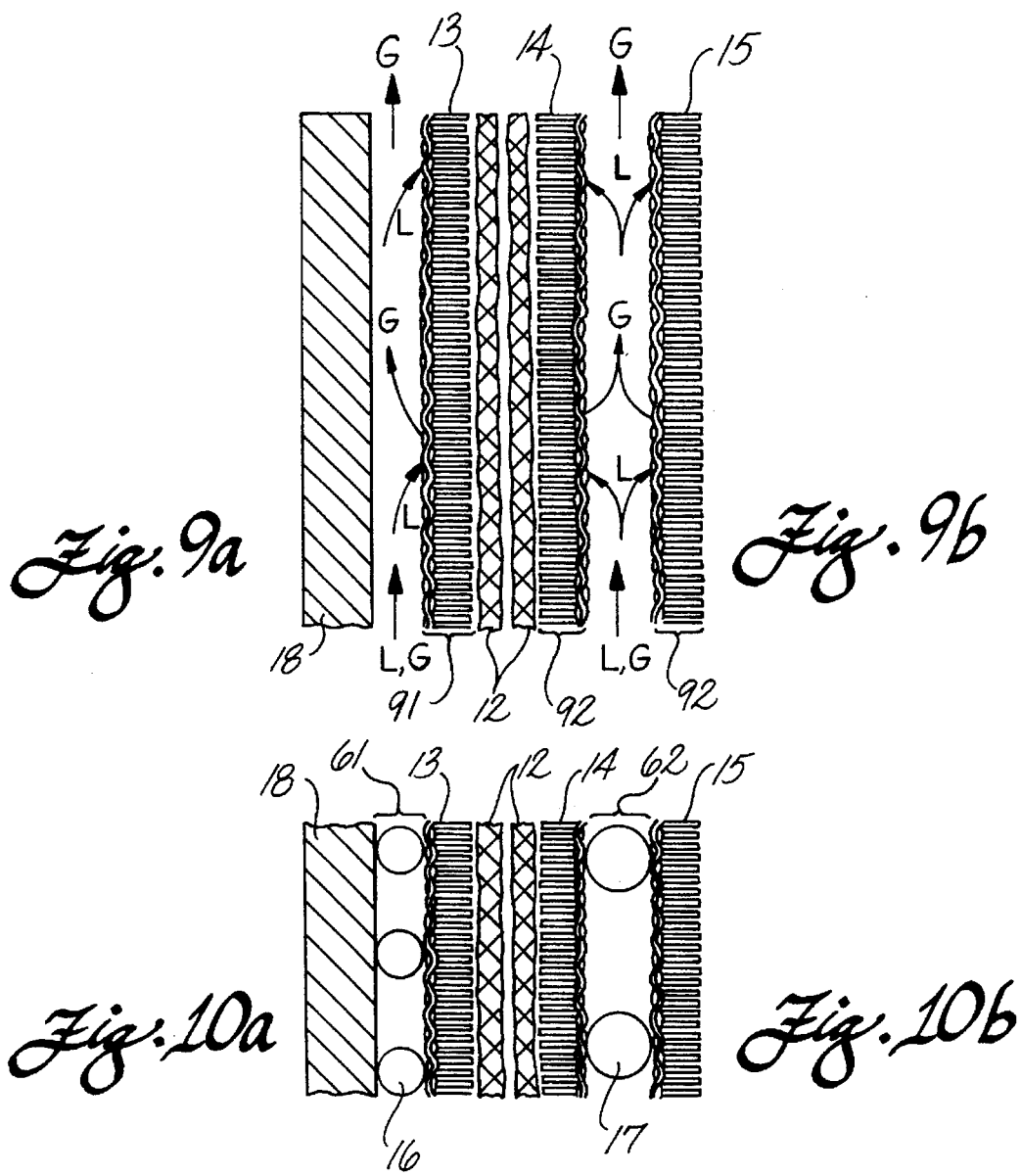

ELECTROLYSIS CELL AND METHOD FOR GAS-DEVELOPING OR GAS-CONSUMING ELECTROLYTIC PROCESSES

FIELD OF THE INVENTION

The invention relates to an electrolysis cell for gas-developing or gas-consuming electrolytic processes as well as to a method for operating the electrolysis cell.

BACKGROUND OF THE INVENTION

An electrode consisting of several very thin foil-like elements with parallel arrangement is described in DD-PS 285 125 and WO 91/00379 A1. Between the adjoining elements of one electrode there is a narrow gap which causes the capillary effect.

Very thin fine-structured electrodes of this kind have a high degree of efficiency. On one side the surface involved in the reaction is very large while on the other side the capillary forces ensure an intensive electrolyte exchange and the discharge of the gas formed cross-wise through the electrode into the degasification chamber each side of the reaction surface. This degasification chamber must be several millimeters deep depending on the structural height of the electrolysis cell and thus takes up space in the order of magnitude of the electrode itself.

It is not possible to dispense with the degasification chamber while retaining the capillary conditions which are advantageous, per se, between the electrode elements because the electrode elements which are structured substantially across the electrode plane do not allow hardly any vertical material transport. DD-PS 285 127 and DD-PS 285 128 describe electrode elements with different profiles, They serve to maintain the capillary gaps through simple positioning of adjoining electrode elements and also to provide their electrical contact.

However even when using unprofiled electrode elements and a vertically permeable capillary gap electrode it would not be possible to dispense with the degasification chamber. The gas bubbles cannot rise unhindered in the capillary gaps, They would coagulate into large bubbles which take up the entire width of the electrode and then "blow out" the electrolyte from the electrode.

DD-PS 285 122 discloses an electrolysis cell which without using a membrane which separates the anode from the cathode chamber ensures separation of the gases thus formed. To do this the electrodes which are made from thin foil-like elements with capillary spacing are sealed sufficiently well from the cell wall enclosing same. The distance between the electrodes must correspond to at least three times the bubble release diameter, Furthermore in the upper cell area a partition is provided which prevents the gases formed in the anode and cathode chambers from mixing in the upper electrolyte-free chamber.

FR 22 44 836 shows an electrolysis cell with an electrode made of several parallel oblong parts wherein the adjoining parts should have a distance in the range of 1.5 to 10 mm, Thus even with an electrode spacing of 6 mm maximum and a current density of 2 kA/m² the electrolyte is reliably prevented from being blown out from the reaction chamber. However there is the drawback that even with a retarded foam formation the gas bubbles remain for a long time in the reaction chamber between the electrodes whereby the electrical conducting capacity of the electrolyte is noticeably reduced.

An electrode of porous materials is described in FR-PS 2 308 701. It consists of a self-supporting compound of two porous layers wherein the surface of the electrode on the reaction side is connected to an insulating fireproof oxide layer whose pore radii have at the most a tenth of the pore radii of the electrode material. The oxide layer is hydrophillic and is permeated by the electrolyte.

The gas formed by the electrode in the large pores cannot readily pass into the smaller pores of the oxide layer so that the gas emerges at the back of the electrode. Furthermore it is proposed to provide the back of the electrode with a hydrophobic gas-permeable layer in order to allow the gas to enter directly into a degasification chamber, separate from the electrolyte.

This electrode does indeed avoid any gas bubble loading of the electrolyte between the anode and cathode, but this advantage is at least partly given up through the insulating oxidic layer. A particular disadvantage however is that such porous materials have little flexibility and are therefore not suitable for setting up an all round electrode zero spacing. Their relative rigidity is often a cause of damage to the partition system, such as membranes and diaphragms. There are also stresses to be taken into account during the operation of the electrolysis cell. From EP-A-O 159 138 an electrolysis cell is known using heavily structured but closed electrode surfaces. Its structure is characterised by vertically aligned first main channels spaced from each other by several centimetres for supplying the electrolyte, and by second main channels provided in between same for discharging the reaction products, more particularly the gases. Between the main channels extend substantially finer structured secondary channels which run horizontal and parallel to the diaphragm and supply the reaction surface with electrolyte. A so-called zero spacing of the electrodes prevents the occurrence of vertical material currents in this area. Thus, fluctuations in the temperature and pressure lead to considerable strains and relative movements which can result in the formation of cracks in the oxide layer which are places of undesired gas precipitation in the reaction chamber of the electrolysis cell between the electrode and partition system.

EP-A-O 159 138 discloses an electrolysis cell using heavily structured but closed electrode surfaces. Its structure is characterised by vertically aligned first main channels spaced from each other by several centimeters for supplying the electrolyte, and by second main channels provided in between same for discharging the reaction products, more particularly the gases. Between the main channels extend substantially finer structured secondary channels which run horizontal and parallel to the diaphragm and supply the reaction surface with electrolyte. A so-called zero spacing of the electrodes prevents the occurrence of vertical material currents in this area.

This electrode construction leads to strong gas enrichment in the channels provided for discharging the gas and which cover a significant part of the reaction surface. The electric resistance thereby rises considerably which leads to an impairment of the degree of efficiency of the electrolysis cell. A disadvantage here is also the solid design of the electrode which requires high standards when producing extremely flat reaction faces in order to achieve the zero spacing.

As opposed to most electrolysis processes where the electrodes are completely covered by the electrolyte the fall film electrolysis uses an electrolyte current which moves from top to bottom and thus against the gas bubble flow. In order to ensure sufficient wetting of the electrodes a considerable electrolyte excess must generally be used which is supplied finely distributed at the top of the electrodes. The use of the fall film electrolysis on capillary gap electrodes seems basically suitable to solve the problem of the all round even electrolyte distribution. However at least with those electrodes with vertical gas transport there is the danger of a "blow out" of the electrolyte. Simply because of the two volume flows, electrolyte and gas which are maximum in the upper electrode area and directed against one another, the use of the fall film electrolysis on electrodes with capillary-spaced electrode elements appears problematical.

SUMMARY OF THE INVENTION

The object of the invention is to develop an electrolysis cell for gas-developing or gas-consuming processes according to the preamble of the first patent claim which has an increased capacity while ensuring improved electrolyte and gas transport properties. At the same time the electrolysis cell allows improved compactness and thus a more favorable space-capacity ratio.

A method is also provided for operating the electrolysis cell which guarantees reliable functioning with high degree of efficiency. The formation of aerosols is avoided so as to achieve the lowest possible degree of humidity of the gas.

This is achieved by the electrolysis cell process for operating the cell in accordance with the intention.

According to the invention the area of the electrode on the reaction side is adjoined by at least one capillary gap which offers significantly lower resistance to the gas and electrolyte transport along the plane of the electrode, particularly in the vertical direction, than the edge area. The edge area of the electrode on the reaction side thus has a capillary structure such as allows the gas and electrolyte transport particularly across the electrode plane. The capillary structure can have a quasi single-dimensional or two-dimensional character.

The use of a flexible electrode structure is to be preferred, such as can be formed for example from several thin foil-like mutually supporting electrode elements of which at least each second element is profiled. It is particularly simple and economical to manufacture an electrode from those foil-like electrode elements whose profiled structures are restricted to at least one edge area which is adjoined by an unprofiled or less severely profiled area. This unprofiled area forms the capillary gap for the substantially vertically aligned gas and electrolyte transport. The profiled structure extends to one or both edge areas of the foil-like elements and at least to the edge area involved in the reaction. It can be produced in different ways, for example by undulations or crenellations of the edge area. Coatings can also be used with advantage, particularly if they are of a particularly electrochemically active material.

Very effective are porous structures which are produced for example by using the CVD process (CVD -chemical vapor deposition). However the electrochemical way is also suitable for creating such profiled structures. Thus for example by precipitating a nickel-aluminium layer from which the aluminium is then again dissolved (by washing out with NaOH), it is possible to obtain a porous structure which is known as Rhaney nickel. This is particularly suitable for water electrolysis.

The depth (thickness) of the coatings or the degree of the undulations or crenellations determines the capillary ratios between the mutually supporting electrode elements. The ratios along the profiled edge area are to be different from those in the adjoining area. Depending on the type of electrode elements, a 1 m long electrode has 1 to 10 million contact points in the edge area between adjoining electrode elements. They produce a considerable resistance to vertical fluid and gas transport and hold the electrolyte like a sponge. The transport processes run mainly horizontally thus across the electrode plane.

The substantially unprofiled area adjoining the edge area provides a very much larger (free) cross-sectional area for the vertical transport processes. Also in this area profiled structures are permissible to such an extent as may be advantageous for example for stabilizing the electrode structure and do not increase the resistance for the electrolyte and gas transport which would be detrimental to its functioning. This area should be regarded as "substantially unprofiled" in the sense of the invention for as long as the resistance which opposes a vertical electrolyte and gas transport in the profiled edge area is greater by a multiple (preferably more than 10 times) than the corresponding resistance in the adjoining substantially unprofiled area.

The optimum geometric shape of the electrode according to the invention depends on the process and material parameters. It has proved favorable to fix the or each profiled edge areas at 10 to 50% of the width of the electrode elements and to form a gap width of 5 micrometers to 500 micrometers in the adjoining area.

In an advantageous embodiment of the electrode at least one longitudinally extending deformation area is provided in the substantially unprofiled area of the electrode elements which allows contraction of the electrode width when force is applied across the electrode plane. The elasticity which is thus provided in the electrode allows a connection with the inherently high flexibility so that even smallest deviations from the desired zero spacing of the electrodes are compensated. The elasticity of the electrode elements in the deformation area avoids local over strains or damages to the partition system. The deformation area appears in the widest sense as an area designed angularly to the direction of force, with the included angle becoming smaller when force is applied.

In order to produce the arrangement according to the invention it is however also possible to use electrodes which do not themselves extend over the capillary edge area but represent this edge area themselves. For this, single dimensional or quasi single dimensional capillary structures are suitable, and may for example be in the form of flat woven or knitted structures, fine-mesh honeycomb structures or even in the form of stapled fibres. A further possibility lies in the use of porous sponge-like self-supporting flat surface structures which should, however, be as flexible as possible.

In order to improve the electrolyte holding capacity it is advantageous to use an edge area with hydrophillic properties and to use a capillary gap with hydrophobic properties in order to improve the vertical electrolyte transport.

In order to operate the electrolysis cell according to the invention a process is proposed which is characterised by a starting phase with high electrolyte level and an operating phase with comparatively low electrolyte level in the cell. During the starting phase the dry capillary electrodes are wetted. During filling of the cell the electrolyte must reach such a high level that the gas bubble development is sufficient to move the electrolyte up to the upper edge of the electrode. The most reliable wetting of the electrodes is achieved by flooding the cell up to the top. Then it is possible to return back directly to the very much lower electrolyte level of the operating state. It should however always be kept high enough so that the electrode can be supplied completely uninterrupted with electrolyte. A sufficient amount of electrolyte per electrode chamber can in each case be that which corresponds to the amount of electrolyte which can be stored in the capillary interspaces of the profiled edge areas.

The minimum amount of electrolyte to be actually held in reserve at the foot end of the electrode can be considerably less. It not only depends on the geometric conditions of the electrode but also substantially on the substance and properties of the material as well as process conditions (pressure, temperature, voltage, current) and their fluctuations. Thus, the electrochemical properties and the transport processes are affected by the surface properties of the electrode material. An advantageous modification for the electrode structure according to the invention uses hydrophillic profiled edge areas adjoined by the hydrophobic area for the gas and electrolyte transport.

For the gas-consuming electrolytic process to be carried out the electrolysis cell and thus the electrodes are supplied from below with the corresponding gas. The amount of gas selected must be sure that sufficiently intensive transport processes are maintained for supplying the electrodes. The electrolysis cell can also be operated with high pressure and high temperature so that a part of the electrolyte is present in the vapor phase.

The structure and method of operation of the electrolysis cell will now be described in detail with reference to the drawings which show diagrammatically (not to scale) some variations of possible designs of the invention.

BRIEF DESCRIPTION OF THE DRAWINGS

FIG. 1 shows an anode and cathode with intermediate partition element;

FIG. 2a is an enlarged sectional view of an electrode with electrode elements profiled on alternate sides by undulations;

FIG. 2b is an enlarged sectional view of an electrode with electrode elements profiled on both sides by crenellations in the edge areas and arranged in alternation with unprofiled electrode elements;

FIGS. 3–8 are diagrammatic illustrations of different variations of electrode elements profiled according to the invention and having a deformation area between the profiled areas;

FIG. 9a shows a mono-polar arrangement of an electrode with a substantially single dimensionally directed capillary structure of a woven or knitted flat material;

FIG. 9b shows a bi-polar electrode arrangement using an electrode with a substantially single dimensionally directed capillary structure;

FIGS. 10a and 10b are plan views of FIGS. 9a and 9b.

DETAILED DESCRIPTION

To better understand the invention, reference is made to the drawings, wherein

FIG. 1 shows a sectional view of an arrangement of an anode 1 and cathode 2 with an interposed partition system 3, for example a diaphragm. An enlargement of an electrode part is shown in FIG. 2. The basic materials for the electrode elements 4, 40, 41, 42, 43, 44, 45, 46 are foil-like strips with a thickness of about 20 micrometres to 100 micrometres and a width of about 1 mm to 10 mm.

FIG. 2a shows electrode elements 44 profiled alternately by undulations in an edge area 51, 52. The electrode elements 45 according to FIG. 2b have in both edge areas 51, 52 crenellations and are arranged alternately with unprofiled electrode elements 46. The profiled areas are always designed so that they are suitable for forming the desired spacing between the adjoining electrode elements which are supported against each other in the edge area 51,52.

From the plan view of the electrodes (FIGS. 3 and 4) it is possible to see the deformation area 7 which provides the electrode with its elasticity across its reaction surface. This is a simple angled deflection of the electrode element 40 along its longitudinal axes.

The electrode elements 40 shown in FIG. 4 have in one edge area 52 the profiled areas already described in the form of undulations and crenellations. In the outer edge area 51 they have material coatings which are preferably made from an electro-chemically active and porous material. In order to ensure even spacings between the electrode elements 4, 40, 41, 42, 43, 44, 45, 46 of preferably 5 to 500 micrometres in the area 6, and to improve the electrode stability it is advantageous to provide profiled areas in the two edge areas 51, 52 of the electrode.

FIGS. 5 and 6 show the plan view of electrode sections for a bi-polar electrode arrangement. They therefore have on both edge areas 51, 52 special electro-chemically active coatings (profiling). These electrodes differ from each other with regard to their electrode. elements 41 in that according to FIG. 5 each edge area 51, 52 of the electrode elements is profiled whilst according to FIG. 6 only one edge area 51 or 52 of one electrode element supports a profiling coating each time wherein however adjoining electrode elements are arranged in alternation with each other.

A channel-like deformation runs in the deformation area 7 along the electrode element 41 and is also suitable for holding a sealing or adhesive means in order to separate the two bi-polar areas of the electrode from each other in gas-tight manner. FIGS. 7 and 8 show two further possibilities of an elastic electrode design. They show a U-shaped or S-shaped deformation area.

The method of operation of the electrode according to the invention is determined by the fine-membered capillary structure and also by the transport processes developing in same. The arrows shown on the front electrode element 44 or 45 (cf FIG. 2) indicate diagrammatically and simplified the transport mechanism of the gas (G) and electrolyte (L-liquid).

The description of the method of operation of the electrolysis cell according to the invention may start from a usual operating state which is characterised by a low electrolyte filling level. At the foot area of the electrode standing in the electrolyte a gas is formed which wanders through the effect of the capillary force into the inner area 6 of the electrode. On leaving the foot area which is underneath the electrolyte the gas bubbles carry upwards a certain amount of electrolyte into the capillary gaps. From the edge area 51 and/or 52 of the reaction surface further gas enters and accelerates the vertical upward movement of the gas and electrolyte. During the transport the electrolyte is constantly propelled by the gas in the influence area of the finer structured edge areas 51, 52 and the capillary forces which are greater there. If in the edge area 51, 52 there is a saturation deficiency of electrolyte then a corresponding part is taken up; the remaining part is transported on further. This results however in numerous exchange effects of the electrolyte along its vertical transport path.

The transport of electrolyte and gas takes place within the electrode, namely in the direct current. The electrode is itself supplied with exactly the optimum amount of electrolyte. The greater the consumption of electrolyte the more vigorous the reaction and thus gas formation and thus the more intensive the electrolyte transport.

Similar types of transport processes develop when a cell structure according to FIGS. 9 and 10 is selected. The use of a substantially single dimensional capillary structure requires the use of a separate capillary gap for the gas and electrolyte transport. The integration of this capillary gap and the or each profiled edge areas into the electrode itself, as was possible when using foil-like strips to form the electrode structure is ruled out here. Thus the electrodes 13, 14, 15 represent the capillary edge areas 91, 92 adjoined by the capillary gap which is provided for the gas and electrolyte transport. The creation of the gap is carried out according to the variations shown in FIGS. 9a and 10a by spacers 16 which lie between the electrode 13 and a wall 18 of the electrolysis cell.

FIGS. 9b and 10b show a bi-polar electrode arrangement wherein the electrodes 14, 15 are positioned by spacers 17 and release an intermediate capillary gap 61. Instead of the woven-like electrode structure shown in these FIGS., it is obviously also possible to use a porous or sponge-like electrode. In order to improve the electrolyte holding capacity in the capillary edge areas 51, 52, 91,, 92 which adjoin the reaction faces of the electrode, these edge areas 51, 52, 91, 92 are designed hydrophillic. The adjoining capillary gap 62 has hydrophobic properties in order to improve the vertical transport behaviour.

The self supply of the electrode through the electrolyte being carried along by the gas represents a novel effect in electrolysis technology whereby the properties of the electrolysis cell designed according to the invention are substantially altered. The term "ejector cell" seems to be a sufficiently descriptive term for this.

A further advantage of this electrode consists in the production of very dry gases. The basis for this is again formed by the transport processes in the electrode: the gas bubbles formed at the reaction surface first cross through the profiled edge area 51, 52, 91, 92 and thereby coagulate repeatedly. As the gas rises in the unprofiled capillary area 6, 61, 62 it leads to the formation of large area gas accumulations which prevents the formation of aerosols at the head of the electrode.

Combining the transport chambers of gas and electrolyte makes the preparation of wide separate degasification chambers superfluous. More compact electrolysis cells with an improved space-capacity ratio can thus easily be formed.

I claim:

1. An electrolysis cell for gas-developing or gas-consuming electrolytic processes comprising at least one electrode which has in its edge area on the reaction side electrode elements with a distance between the adjoining electrode elements sufficiently small so as to form a capillary structure which leads to single-dimensional or two-dimensional capillary forces such that movement of the gas and electrolyte in the electrolytic process extends substantially across the electrode plane in the space provided, said edge area being adjoined by at least one capillary gap which offers substantially less resistance to the gas and electrolyte movement along the electrode plane in the vertical direction than the edge area, said electrode plane comprising the reaction side of the capillary structure.

2. An electrolysis cell according to claim 1 wherein the edge area is formed by an electrode comprising several thin foil-like mutually supporting electrode elements of which at least each second element is profiled.

3. An electrolysis cell according to claim 2 wherein the profiled areas comprise areas of undulations or crenellations of the material of the electrode element.

4. An electrolysis cell according to claim 3 wherein the profiled areas are formed by coatings of porous electrocatalytically active material.

5. An eltrolysis cell according to claim 3 wherein between the edge areas of the electrode elements there is at least one deformation area which when force is applied across the electrode plane allows a contraction of the width of the electrode elements and of the thickness of the electrode itself.

6. An electrolysis cell according to claim 1 wherein the profiled areas are restricted to at least one edge area of the electrode elements adjoined by an unprofiled or less heavily profiled area which forms the capillary gap for substantially vertical gas and electrolyte transport.

7. An electrolysis cell according to claim 6 wherein the profiled areas consist of a porous Raney-nickel alloy adjoined by areas where water molecules are repulsed.

8. An electrolysis cell according to claim 7 wherein the profiled edge areas extend over 10 to 50% of the width of the electrode elements.

9. An electrolysis cell according to claim 6 wherein the electrodes have a reaction side, further comprising a capillary gap adjoining the capillary edge area that has on the reaction side a quasi single dimensional or two dimensional capillary structure so that during the electrolytic process gas and electrolyte move substantially across the electrode plane, and the center spacing of the adjoining electrode elements has in the area a width of 5 to 500 micrometers.

10. An electrolysis cell according to claim 1 wherein a compact focused, substantially single-dimensional capillary structure forms the edge area wherein the longitudinal axes of the capillaries include a maximum angle of 75° with the horizontal.

11. An electrolysis cell according to claim 10 wherein a flat surface knitted or woven structure or fine-mesh honeycomb structure or stapled fibres form the edge area.

12. An electrolysis cell according to claim 1 wherein a porous sponge-like self-supporting flat surface structure which has as much flexibility as possible forms the edge area.

13. An electrolysis cell according to claim 1 wherein the edge area has hydrophilic properties to improve the electrolyte holding capacity and the capillary gap has hydrophobic properties to improve the vertical transport behaviour.

14. A process for operating an electrolysis cell having a starting phase and an operating phase for gas-developing or gas-consuming electrolytic processes comprising the steps of establishing at least one electrolytic level in the electrolysis cell which is sufficiently high that gas bubbles formed are sufficient to raise the electrolyte up to the top edge of an electrode during the starting phase so that the electrode is supplied completely with electrolyte during the electrolytic process and dropping the electrolyte level during the operating phase only enough so that an uninterrupted supply of electrolyte for the entire electrode is maintained.

15. A process according to claim 14 further comprising the step of feeding gas bubbles to the electrodes from below the electrolyte surface during gas-consuming processes.

16. A process according to claim 14 wherein the electrolysis cell is operated at pressure and temperature such that a part of the electrolyte exists in the vapor phase.

* * * * *